H. E. PELLETIER.
VALVE.
APPLICATION FILED APR. 3, 1920.
1,380,586.
Patented June 7, 1921.
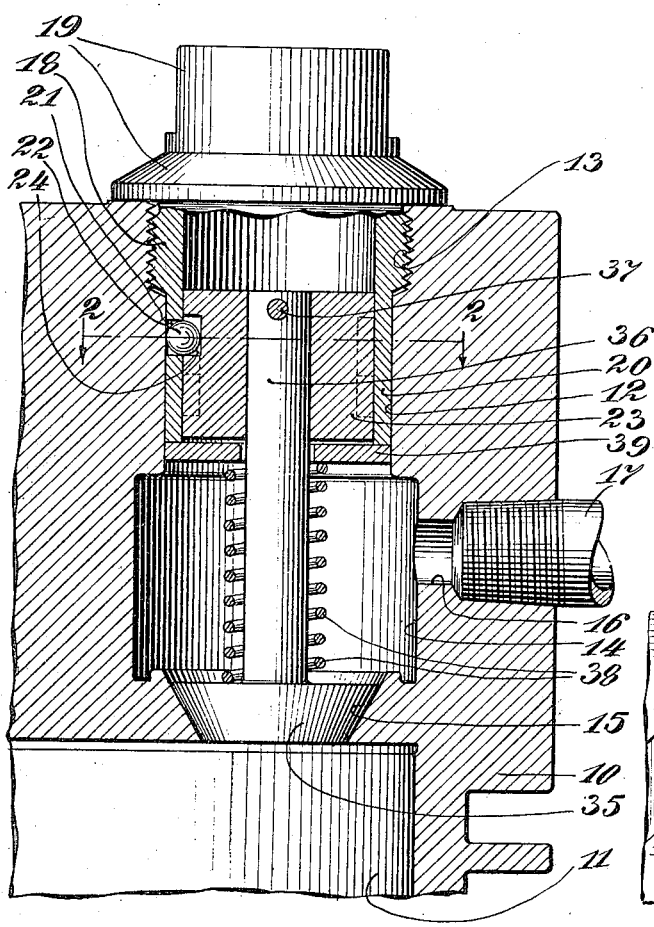
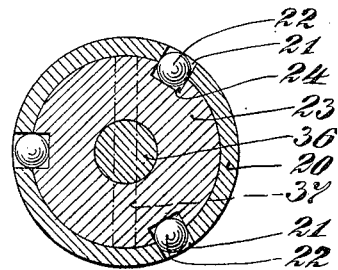
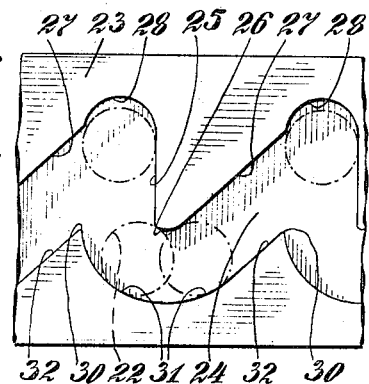
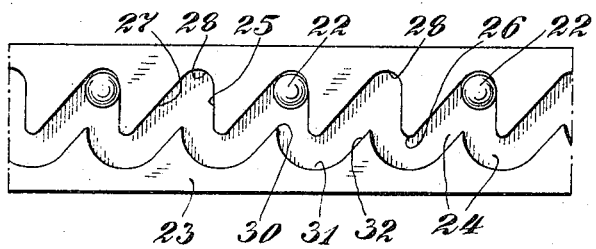
Inventor
Henry E. Pelletier
By his Attorney
Fredk C. Fischer

UNITED STATES PATENT OFFICE.

HENRY E. PELLETIER, OF NEWARK, NEW JERSEY, ASSIGNOR TO PELLETIER PRODUCTS MFG. CO., INC., OF ELIZABETH, NEW JERSEY, A CORPORATION OF NEW JERSEY.

VALVE.

1,380,586.    Specification of Letters Patent.    Patented June 7, 1921.

Application filed April 3, 1920. Serial No. 370,924.

*To all whom it may concern:*

Be it known that I, HENRY E. PELLETIER, a citizen of the United States, residing in the city of Newark, county of Essex, and State of New Jersey, have invented certain new and useful Improvements in Valves, of which the following is a full, clear, and exact description, such as will enable others skilled in the art to which it pertains to make, construct, and use the same, reference being had to the accompanying drawings, and to numerals of reference marked thereon, forming a part of this specification.

The principal object of the invention is to provide an efficient and simple valve for combustion engines, pumps, compressors, engines and the like, adapted to yieldingly open under pressure applied below the valve seat, and automatically close immediately the pressure is reduced to normal, and also to prevent back pressure in the manner of a check valve.

A further object is to provide means positively changing the position of the valve proper, relative to its seat, by imparting to it a positive rapid rotary movement, taking place at every actuation, causing an automatic grinding of the valve in its seat and so maintaining a tight seating action, uniform wear, and preventing foreign matter from lodging in the seat.

These objects are attained by the novel construction, combination and arrangement of parts hereinafter described and shown in the accompanying drawings, forming a material part of this disclosure, and in which:—

Figure 1 is a partial side elevational, partial vertical sectional view, taken through a valve made in accordance with the invention.

Fig. 2 is a transverse sectional view taken on line 2—2 of Fig. 1.

Fig. 3 is a view showing a flat development of the cam groove formed in the movable plug.

Fig. 4 is an enlarged fragmentary view of the same.

Referring to the drawings in detail, the numeral 10 designates a fragment of a casing having a chamber 11 adapted to contain fluids or gases under pressure.

In the wall of the casing is a bore having a screw threaded upper portion 13, the bore communicating with the valve chamber 14, leading to the main chamber 11, through the inverted conical valve seat 15, the area of which is restricted relative to that of the chamber 14 with which it is in register.

Leading out from the valve chamber 14, through the wall of the casing 10 is another bore 16 into which may be threaded an outlet pipe 17 to receive the discharge from the valve chamber.

A threaded cap 18 is screwed into the threaded bore 13, the cap having a flanged expanded head 19, flattened or otherwise arranged for manipulation by a wrench, while extending down from the threaded portion is an annular sleeve 20 fitting the interior of the valve chamber 12 at its upper bored portion and formed through the wall of the sleeve, at three equi-distant points, are openings 21 constituting seats for hard balls 22, the diameter of which is approximately twice that of the thickness of the wall of the sleeve.

A cylindrical plug 23 is fitted to slide within the sleeve 20 and has formed in its periphery a zig-zag continuous sinuous cam groove of uniform width, generally designated by the numeral 24, the same consisting of six undulations, their upper edges comprising vertical elements 25, convexly curved or rounded slightly at their lower points 26 and blending into angular risers 27 leading to concave curves 28 raised slightly beyond the point of tangency, and from whence the next adjacent vertical elements start.

The lower edge of the groove is substantially the complement of the upper, consisting of points 30, directly below the point of tangency of the risers 27 and curves 28, the points 30 being joined by concave curves 31 formed of different radio and having short angular elements 32 parallel with the risers 27.

Thus the balls 22, contained in their seats 21, and backed by the inner surface of the bore 12, project inward for substantially half their diameter and engage the cam groove in such manner that when the plug 23 is raised, as to move vertically, but as it is lowered it is caused to rotate one sixth of a revolution, in an entirely automatic manner, at each full movement.

A conical valve element 35 is suited to the seat 15 and provided with a central stem 36 passing through the plug 23 in which it is secured by a transverse pin 37 or like fastening device, level or flush with the upper surface of the plug, which is spaced below the cap element 19 somewhat in excess of the full movement of the valve 35.

This valve is held normally to its seat by a compression spring 38, coiled about the stem 36 and abutting at its upper end against a washer 39 loosely fitting the bore 14 and resting against the end of the sleeve 20, which extends downward past the lowest point the plug 23 can assume.

In operation, when the pressure in the chamber 11 exceeds that of the spring 38, the valve element 35 rises, relieving the excess pressure within the casing, any effluent passing out the pipe 17.

Obviously when the valve rises the plug 23 is carried with it, and, due to engagement of the balls in the cam grooves, a turning or twisting effect is produced, causing the valve to be re-seated, when the pressure has subsided, sixty degrees from its former position, the re-seating being effected with a distinct grinding effect, tending to maintain the contacting surface of the valve and its seat mutually in good condition and equalizing any wear that may take place, as wire cutting by the current passing between the surfaces.

Thus the valve at each opening and closing action, will grind its seat, making a tight closure and preventing any foreign matter from lodging in the seat.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claims.

Having thus described my invention, what I claim as new and desire to secure by Letters Patent, is:—

1. A valve comprising a body having a chamber and an outlet therefor, a conical seat forming an inlet into the chamber, a cap engaging said body registering with said seat, a sleeve formed with said cap extending into the chamber, a plug movable in said sleeve, a valve element suited to said seat rigidly connected with said plug, and means carried coöperatively in said sleeve and plug for partially rotating said valve at each full movement thereof.

2. A valve comprising a chambered body having an axial inlet, a valve seat circumjacent the inlet, a valve head suited to engage said seat, a stem fixed in said head, a cylindrical plug secured at the opposite end of said stem, a sleeve removably engaged in the chamber of said body in which said plug is slidably and rotatably incased, a sinuous endless cam groove in the periphery of said plug, and means carried by said sleeve engaging in said cam groove whereby a partial rotary movement is imparted to said plug and valve head at each full opening and closing action of the valve.

3. A valve comprising a chambered body having a lateral outlet and an axial inlet, a valve seat surrounding the inlet, a valve head fitted thereto, means for normally pressing said valve head against its seat, a non-rotatable sleeve in the chamber having ball seats therein, a plug movable in said sleeve, a continuous cam groove in the periphery of said plug, said groove being comprised of blending alternate angular and vertical elements forming regular undulations, balls carried in the seats engaging the cam groove causing partial rotation of said plug when moved downwardly, and a rigid stem connecting said valve head and plug.

4. A valve comprising a chambered body having an outlet, an annular valve seat constituting an inlet at the bottom of the chamber, a movable valve element suited to said seat, a cap engaged at the top of the chamber, a sleeve extending downward from said cap, said sleeve containing a plurality of spaced openings arranged in the same horizontal plane, a plug movable in said sleeve, a stem rigidly connecting said plug and valve element, an endless undulating cam groove in the periphery of said plug, and balls seated in the mentioned openings of said sleeve engaging in alternate undulations of the cam whereby a rotary movement is transmitted to the plug coincidently with its vertical movement.

5. A valve comprising a body having a chamber and an outlet therefor, a valve seat at one end of the chamber, a sleeve extending into the chamber, a plug movable in said sleeve, a valve element suited to said valve seat rigidly connected with said plug and means carried coöperatively in said sleeve and plug for partially rotating said valve at each full movement thereof.

6. A valve comprising a body having a chamber, a valve seat at one end of the chamber, a valve head suited to engage said seat, said valve head provided with a stem, a cylindrical plug secured at the opposite end of said stem, a sleeve removably engaged in the chamber of said body in which said plug is slidably and rotatably incased, a sinuous endless cam groove in the periphery of said plug, and means carried by said sleeve engaging in said cam groove whereby a partial rotary movement is imparted to said plug and valve head at each full opening and closing action of the valve.

This specification signed and witnessed this second day of April, 1920.

HENRY E. PELLETIER.

Witnesses:
 FRED'K C. FISCHER,
 F. NOLL.